L. MILLER.
GRAIN BINDER.

No. 259,328. Patented June 13, 1882.

5 Sheets—Sheet 1.

WITNESSES
Franck L. Ourand
W. Blackstock

INVENTOR
Lewis Miller
By Le Hill
His ATTORNEY.

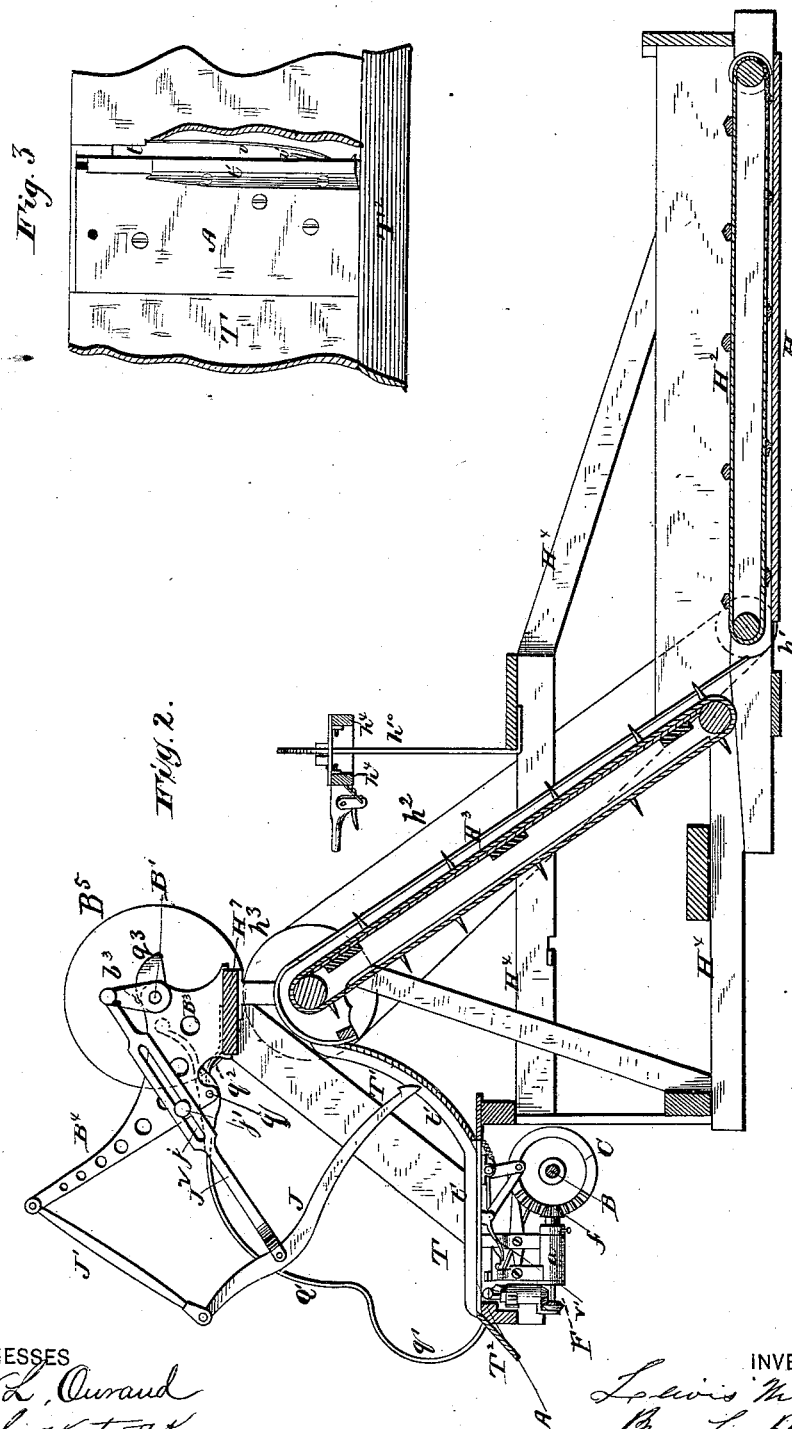

L. MILLER.
GRAIN BINDER.

No. 259,328. Patented June 13, 1882.

Witnesses.
F. L. Ouraud
W. Blackstock

Inventor.
Lewis Miller
By L. Hill
His Attorney.

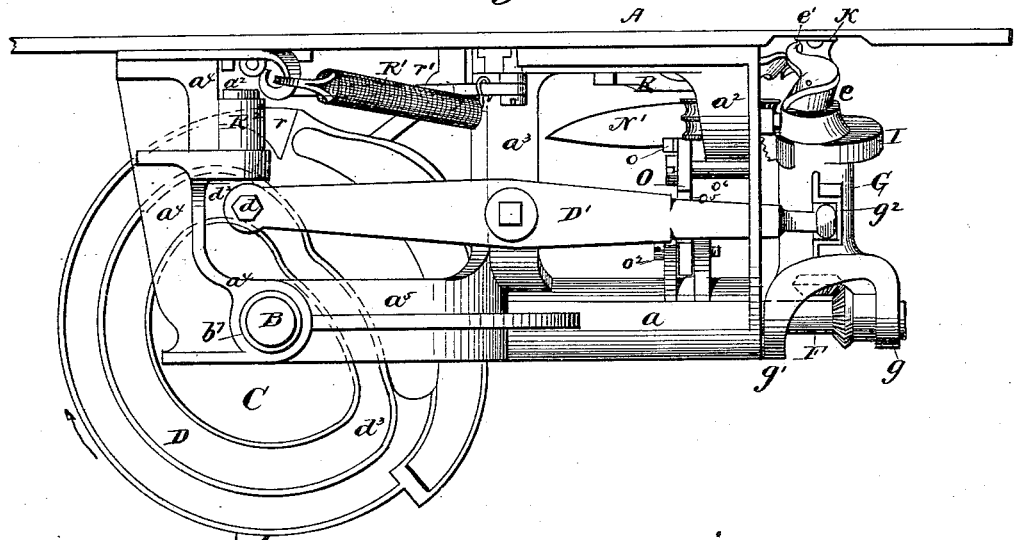

L. MILLER.
GRAIN BINDER.

No. 259,328. Patented June 13, 1882.

Witnesses.
F. L. Durand
W. Blackstock

Inventor
Lewis Miller
By L. Hill,
His Attorney

UNITED STATES PATENT OFFICE.

LEWIS MILLER, OF AKRON, OHIO.

GRAIN-BINDER.

SPECIFICATION forming part of Letters Patent No. 259,328, dated June 13, 1882.

Application filed June 30, 1879.

*To all whom it may concern:*

Be it known that I, LEWIS MILLER, of Akron, in the county of Summit and State of Ohio, have invented a certain new and Improved Grain-Binder; and I do hereby declare the following to be a full, clear, and exact description of the same, reference being had to the accompanying drawings, forming part of this specification, in which—

Figure 1:
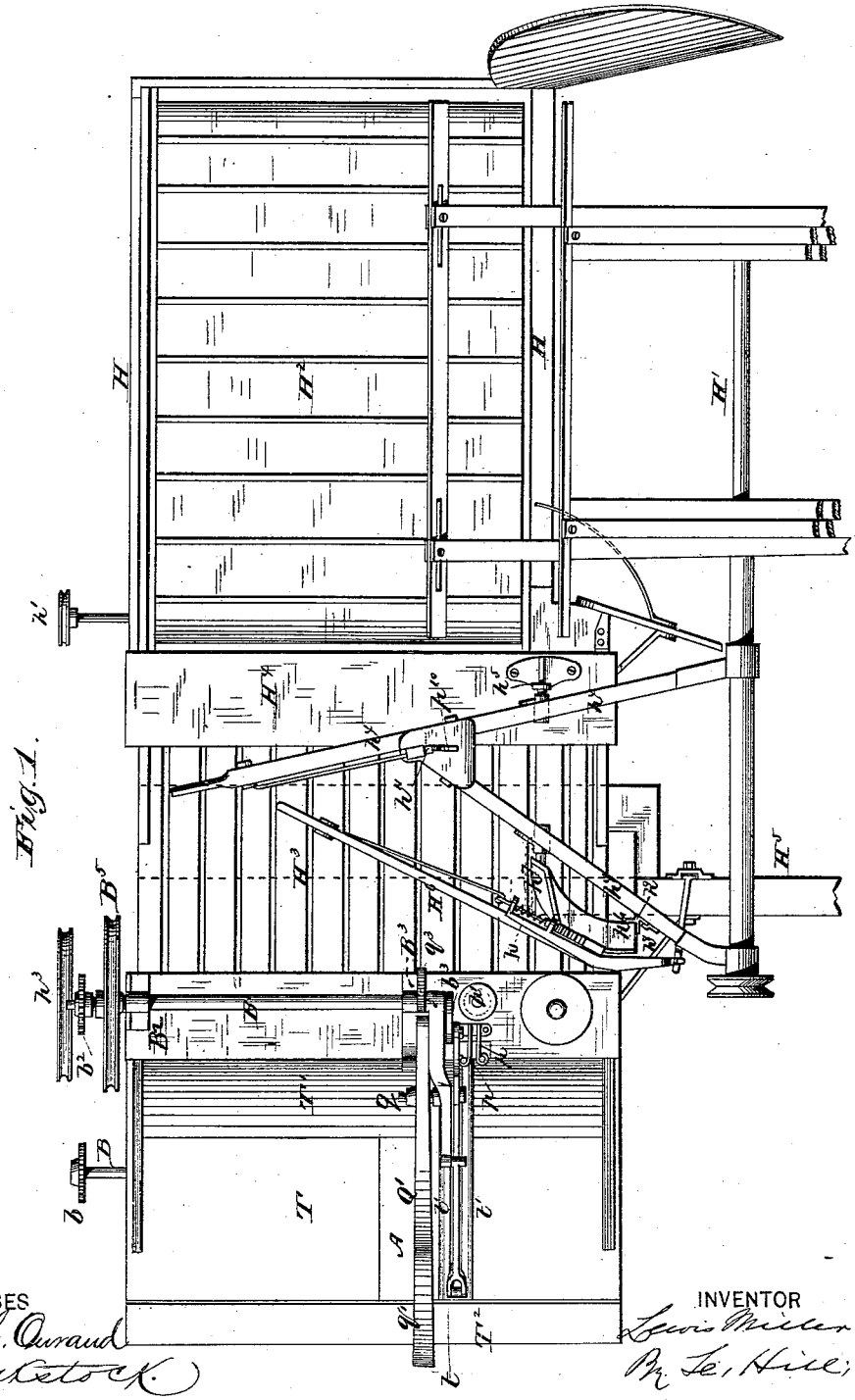
Figure 4:
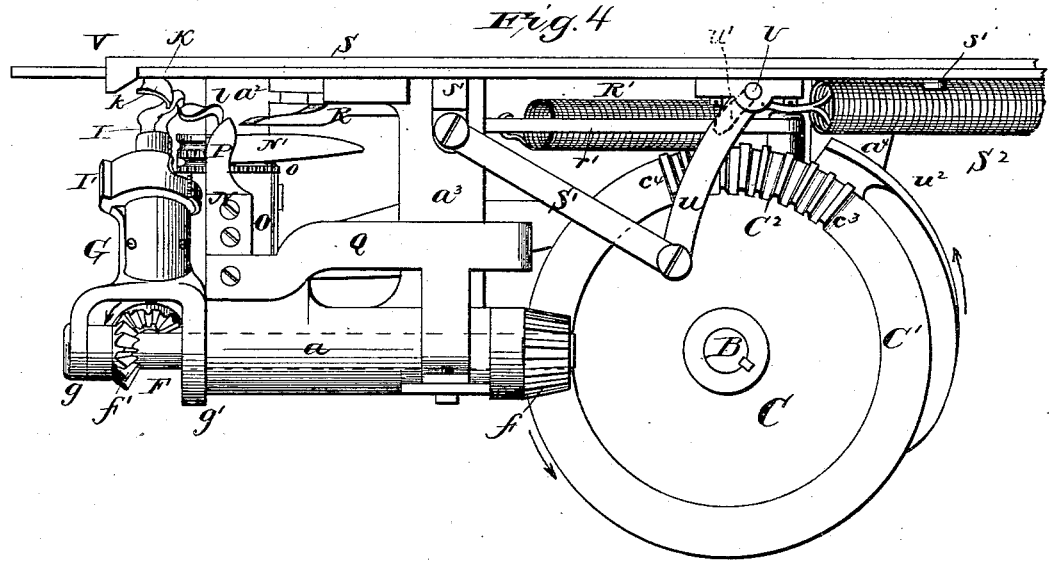
Figure 5:
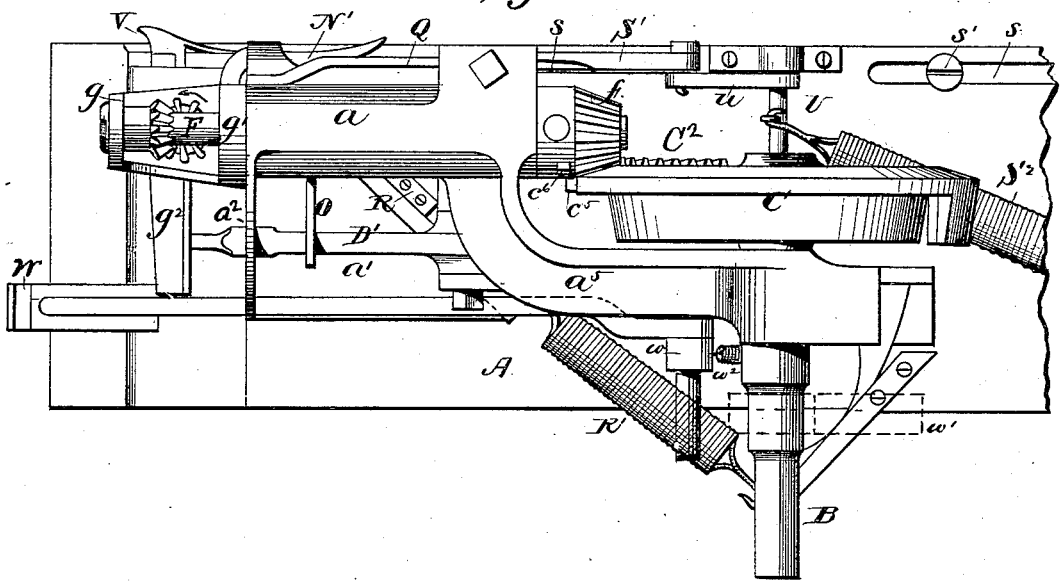
Figure 8:
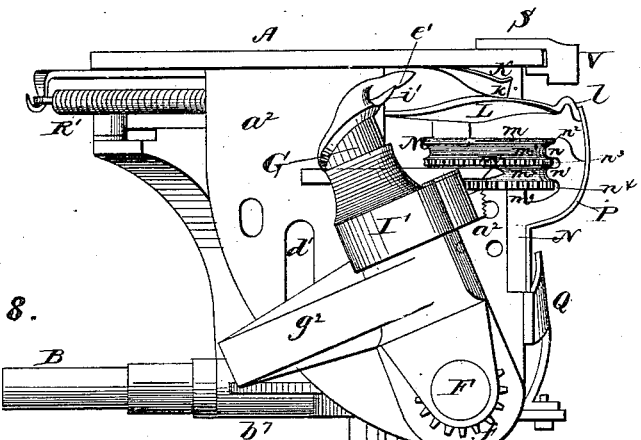
Figure 9:
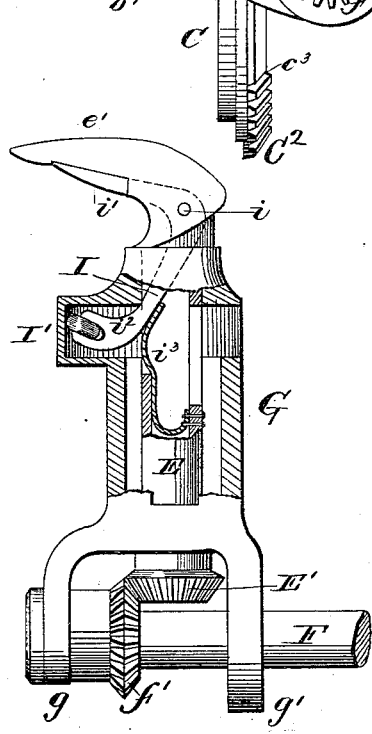

Figure 1 is a top plan view of a harvester and binder embodying my improvements. Fig. 2 is a longitudinal section of the same. Fig. 3 is a view of a portion of the binding table or platform. Figs. 4 and 6 are side elevations of the tying mechanism. Fig. 5 is a bottom plan of the same. Figs. 7 and 8 are respectively rear and front elevations of the same, and Fig. 9 is a detail view of the looping and tying head.

Like letters of reference in the several figures indicate the same parts.

The object of this invention is to produce a simple and effective "cord-binder" to be used in connection with a harvesting-machine for binding into sheaves the grain cut and delivered to it by the harvesting machinery.

In the harvesting-machine herewith shown, which is only one of the many forms of machine to which my improvements may be applied, H represents the grain-platform; H', the reel; H$^2$, an endless apron rake, working on the platform and delivering the grain to an elevating-rake, H$^3$, which dumps it upon a binding table or platform, T; H$^4$ H$^4$, parts of the frame-work of the machine; H$^5$, the draft-tongue, pivoted to the machine at $h$; H$^6$, an adjusting-lever and connecting-rod, having a snap-catch and toothed segment, whereby the inclination of the tongue may be adjusted; and $h'$ $h^2$ $h^3$, the driving-pulleys and belt, whereby the rakes are connected so as to act simultaneously.

The reel-shaft here shown is mounted in the forked ends of a bifurcated lever, $h^4$, pivoted to two vertical posts, $h^5$ $h^6$, or directly to the post $h^5$ and to an arm or casting, $h^7$, extending from post $h^6$, and it is steadied and strengthened by a flange or clip, $h^8$, which locks around a curved flanged guide-plate, $h^9$, attached to the post $h^6$. The reel thus constructed is adjusted higher or lower with reference to the cutter-bar and platform by means of a curved rack, $h^{10}$, and a snap-catch, $h^{11}$, in the usual manner.

The outer edge of the binding-table T is beveled off and protected by a metal plate, as shown at T$^2$. The binding-table is provided with a vertical slot, $t$, extending from its inner edge to the plate or outer incline, T$^2$, to accommodate the sweep of the needle. Guard ribs or flanges $t'$ are arranged on each side of the slot $t$, and, if preferred, are made to extend up the incline T', between the inner edge of the table and the outer side of the elevating-rake H$^3$, as shown.

In the operation of the machine the needle J passes down into the slot at the inner edge of the table, sweeps forward in the slot toward the outer end thereof, and after the binding is accomplished rises out of the outer end to a sufficient height not to interfere with the delivery of the grain upon the platform, when it again descends into the inner end of the slot, as before. The needle is mounted upon a cross-bar, H$^7$, above the top of the elevating apron or rake, and is driven by a crank, $b^3$, upon a shaft, B', mounted in bearings B$^2$ B$^3$ upon said cross-bar, the shaft being driven by a belt extending from a large pulley, B$^5$, upon the shaft B' to a small pulley upon the shaft that carries the pulley $h^3$. The standard or plate B$^3$ is extended outward and upward into an arm, B$^4$, as shown. The needle is directly supported by two articulated bars, J' J$^2$, the upper one, J', extending from the top of the needle to the top of the arm B$^4$ and jointed to both, and the lower one, J$^2$, extending through guides to the crank $b^3$; or in lieu of such guides the bar J$^2$ may be slotted, as shown at $j$, and be guided by a stud, $j'$, projecting from the side of the plate B$^3$ into or through said slot. This construction causes the revolution of the shaft B' to impart to the needle the peculiar movement hereinabove described.

In connection with the needle a holding and compressing arm, Q', is pivoted at $q$ to the side of the plate B$^3$, and is provided with a curved outer end, $q'$, in which the gavel is held and compressed by the forward sweep of the needle. The curved bar Q' $q'$ is normally held down to its work by a spring, $q^2$, acting upward against it behind its pivot, and when the bundle has been tied and is ready to be discharged from the machine said compressing-bar is raised by the action of a cam-arm, $q^3$, on the shaft B' striking down upon its rear end.

The tension apparatus consists of two flat plates, $p\,p$, one or both of which may be springs and either or both of which may be adjustable. The cord running from a reel or guide-pulley, $p'$, passes between the two plates on its way to the needle, and is put under suitable tension by their pressure against it.

Instead of flat plates, it is obvious that flat-faced blocks or pulleys forced against the cord by spring-pressure, so as to cause the proper friction against their axles or supporting-studs, would answer the same purpose.

The binding mechanism, apart from the needle and compressor, is arranged on the under side of the table T at that side of the slot which lies toward the rear side of the machine, and the binding-head, hereinafter described, is so located as to act directly under that end of the slot which is nearest to the incline $T^2$, which I denominate the "outer" edge of the binding-table. The binding mechanism thus arranged is driven by a shaft, B, extending under the table from the rear end of the machine nearly to the edge of the slot $t$, said shaft being driven by any suitable means—as, for example, by a sprocket-wheel, $b$, upon its outer end, and a chain extending therefrom to a similar sprocket-wheel, $b^2$, on the outer end of the shaft B'. The two sprocket-wheels $b\,b^2$ being of the same size, the working of the looping and tying mechanism driven by the shaft B can be accurately timed to the movements of the needle and compressing arm driven by the shaft B'. The binding mechanism is all attached to and supported by a metal plate, A, which is either fastened to the under side of the table T at the rear side of the slot $t$ or else forms a portion of said table, the latter being the construction shown in the drawings. To the under side of plate A a stout frame-work or "hanger" is attached by screws or rivets, said hanger having a tubular journal box or bearing, $a$, a slotted bed, $a'$, three standards, $a^2\,a^3\,a^4$, and a connecting-piece, $a^5$, extending from the tubular bearing and middle standard, $a^3$, to the inner standard, $a^4$, all these parts being for the purposes which will presently appear.

The shaft B extends through a transverse box or bearing, $b^7$, at the lower end of the standard $a^4$ and inner end of extension $a^5$, and supports upon its end a large and strong gear-wheel, C, having a cam-track, D, on its inner or rear side. A counter-shaft, F, is supported in the bearing $a$, and driven intermittingly by the cogs on the outer or front side of the wheel C, which gear into a miter-pinion, $f$, on the inner end of said shaft. At its outer end the shaft projects beyond the standard $a^2$ and carries a tubular casting, G, which is bifurcated or provided with two lugs, $g\,g'$, at its lower end, through which lugs the projecting end of the shaft F extends, as shown, so that the casting is enabled to oscillate on the shaft as a pivot. The casting G is furnished on its rear side with a laterally-projecting arm, $g^2$, grooved longitudinally along its inner face, and is oscillated by means of a lever, D', pivoted to the side of the standard $a^3$. The inner end of the lever is provided with a stud, $d$, which travels in the cam-track D, and its outer end, guided by a slot, $d'$, in the plate $a^2$, swings or oscillates the casting G by power received from the wheel C through the medium of the cam-track above referred to. The twisting and looping head works in the oscillating casting G, and is constructed as follows:

E is a shaft having its bearings in the interior of said casting, and provided with a miter-wheel, E', at its lower end, which gears with a similar wheel, $f'$, on the shaft F, so that as said shaft is intermittingly rotated it will, by means of said two bevel-gears, rotate the looping-head. The upper end of the shaft E projects through the end of the oscillating casting, and is provided with an exterior spiral groove, $e$, and a curved upwardly-inclined hook or jaw, $e'$.

To the side of the shaft E there is pivoted, at $i$, an angular block or plate, I, the upper end of which extends outward under and against the lower side of the jaw $e'$, so as to form another jaw, $i'$, co-operating therewith. The two jaws are flattened along their proximate surfaces, so as accurately to fit each other, and their outer top, bottom, and lateral surfaces are made smooth, tapering, and conforming to each other in curvature, so that the cord, when knotted, can easily slip off of them. The block I has a projecting lateral stud, $i^2$, below the pivot $i$, which, as the shaft E rotates, strikes against a surrounding eccentric or cam surface, I', and thereby is forced inward, so as to open the jaws $e'\,i'$. A strong spring, $i^3$, forces the jaws together as soon as the stud $i^2$ passes off the eccentric surface I'. A spring stripping-plate, K, projects from the plate A down against the upper side of the looping-head for the purpose of facilitating and insuring the stripping of the band from the jaws as the latter are retracted after forming the knot, and it is provided with a rear flange, $k$, which also serves to prevent any but the proper part of the cord from entering between the jaws. The shaft E rotates in the direction toward which the curved jaw $e'$ points, as indicated by the arrow.

The operation of the looping-head is briefly as follows: In its normal position its jaws are closed and it is swung back out of the way of the needle, moving in the slot $t$. When the cord has been carried down by the needle and swept outward to the proper position in front of the binding-head the casting G oscillates on its axis, so as to bring the closed jaws forward and cause the hook $e'$ to pass behind or on the inner side of the cord. The shaft E then immediately rotates, causing the hook $e'$ to seize the bight of the cord, carry it around with the head, and thereby form a loop in it. During this forming of the loop the cam-surface I' opens the jaws, thereby spreading and enlarging the loop formed or forming around them, and the structure of the parts is such that just as the jaws thus opened complete their rotation one end of the double strands of the cord is brought directly between the open jaws across the middle of the loop. The jaws then close upon such strands, gripping that part of the cord tightly, and at the same time, by the act of closing, releasing their outward pressure against the loop and leaving the latter free to slip off. The looping-head is then suddenly retracted, thereby drawing the gripped strands through the loop, slipping the loop off, and drawing the knot tight. If the mere retraction of the jaws would not, although in most cases it will, be sufficient to release the loop from them, the edge of the spring-plate, bearing against the upper side of the jaw $e'$, will engage with the loop and prevent it from being retracted with the head. The cutter then severs the knotted portion of the cord from the end still held in the clamps, and the bound gavel is ready to be discharged from the machine. The mechanism by which these movements of the head are obtained and are accurately "timed" to each other and to the movements of other parts of the machinery is as follows: The pinion $f$ is constructed with any suitable number—say eleven—teeth, equally spaced, nine of the eleven being of the usual form, as shown at $c$, one being short and flat on its outer end, as represented at $c'$, and one, $c^2$, with its outer end flattened in the same plane as the outer end of the cog $c'$.

The side of the wheel C is constructed with a smooth annular lateral rim, C', interrupted by a cog-segment, C$^2$, having as many cogs, less two, as the entire number on the pinion $f$. The spaces between the cogs C$^2$ extend into the side of the wheel beyond the plane of the smooth surface C' and the cogs project outward beyond such plane. The cog-segment terminates at each end in a notch or cog-space, as shown at $c^3$ $c^4$, the front space, $c^4$, being nearly of double width, and having its front end rounded or beveled off, so that the tooth $c^2$ can readily drop into it and allow the pinion $f$ to turn at the proper time. A projecting stud, $c^5$, arranged on the periphery of the wheel C at the front end of the cog-segment, strikes against a projecting stud, $c^6$, arranged on the side of the pinion $f$ in line with the short cog $c'$, just as the space $c^4$ comes to the cog $c^2$, and thereby forces said cog into said space and puts the two wheels in gear. By the continued movement of the wheel C the nine cogs of the segment C$^2$, acting on the nine normal cogs of the pinion $f$, turn the latter and its shaft one entire revolution and bring the last one of said cogs, together with the cogs $c'$ $c^2$, in a vertical line just as the cog-segment C$^2$ passes clear of them, when the plane rim C' immediately comes in contact with the ends of the three cogs last mentioned, and holds the pinion $f$ and its shaft F motionless during the remainder of the revolution of the wheel C.

The cam-track D is so shaped and arranged as to advance the twisting-head toward and across under the slot $t$ at the instant before the shaft F is thus set in operation, hold it advanced during such operation, retract it quickly immediately after the shaft F has ceased to rotate, and hold it thus retracted during the remainder of the revolution of the wheel C, to which end it is only necessary to construct the cam D in nearly the shape of the letter D, taking care to arrange one of its angles, $d^2$, at the rear end of the cog-segment (on the opposite side of the wheel,) and the other angle, $d^3$, almost opposite to the front end of said segment, in which case the stud $d$, while passing across the disk or wheel in nearly a straight line from $d^3$ to $d^2$, will hold the looping-head advanced during the engagement of the cogs, and while passing around the circular portion of the track from $d^2$ back to $d^3$ will hold the head retracted during the time when the cogs are not engaged. The two studs $c^5$ $c^6$ insure absolute accuracy and certainty in the engagement of the cogs, and the tooth $c^2$, in conjunction with the plane surface C', insures equal accuracy and certainty in preventing the operation of the shaft F when its pinion $f$ is not in gear with the segment C$^2$—that is to say, the tooth $c^2$ alone will prevent the shaft F from rotating forward with the wheel C, and, in conjunction with the short tooth and the tooth next adjacent thereto, will firmly hold the said shaft from being rotated in either direction until the plane rim C' has passed.

Instead of employing clamping-jaws, as heretofore, to hold the ends of the cord during the tying operation, I provide for holding them by means of a ratchet-wheel and concave block in the following manner:

M is a grooved wheel, mounted upon a vertical shaft or stud, which extends up from a projecting shoulder on the standard or plate $a^2$, and, if preferred, may be held and steadied at its upper end by a bearing formed in a horizontal plate, L, affixed to the plate $a^2$. The wheel M has a smooth peripheral flange or rib, $m$, around its upper edge, a ratchet rib or flange, $m'$, around its lower edge, a notched or roughened rib, $m^2$, around it midway between the ribs $m$ $m'$, and smooth concave or grooved surfaces $m^3$ $m^4$ between the ribs $m$ $m^2$ and $m'$ $m^2$, respectively. A pivoted dog or pawl, $o$, engages with the ratchet to turn the wheel M forward, and, being always in contact with said wheel, prevents it from rotating backward. The dog or pawl is pivoted to the side of a large supporting-plate, O, which in turn is pivoted to the standard $a^2$, at $o^2$, is guided and limited in its movements by a curved slot, $o^3$, and stud $o^4$, projecting from the plate $a^2$ into said slot, and is actuated by the lever D', passing through a slot, $o^5$, formed in its outer end. The wheel M thus constructed and intermittingly operated works in combination with a concave block, N, attached to the edge of the plate $a^2$, as shown. The concave side of the block is formed with two ribs or beads, $n$ $n'$, projecting into the groove $m^3$ $m^4$, respectively, and with three recesses, $n^2$ $n^3$ $n^4$, corresponding to the ribs on the wheel. It is also provided with a curved tapering horn, N′, which extends obliquely inward across, or partially across, the vertical plane of the slot $t$, so that when the binding-cord, carried down at the inner end of the slot $t$, is moved outward in said slot by the needle it will catch behind the horn and be thereby guided into the angle, where the wheel M and concave N co-operate to clamp and hold it securely.

On the front side of the block N a curved plate, P, is secured, which projects above the upper edge of the horn N′ and at the distance of about one-fourth of an inch therefrom, and is suitably smoothed and tapered to prevent its catching and holding the cord. The extreme upper end of the plate P bears against a small curved and oblique arm, $l$, extending from the end of the plate L, as shown, and assisting to guide the cord to the binding-head. Below the horn N′ a long guide-bar or guard, Q, extends nearly or quite parallel to the vertical plane of the slot $t$ to assist in properly guiding the cord to the clamping mechanism.

A sliding cutter, R, severs the cord immediately over and in front of the wheel M. Said cutter works in an oblique dovetail groove or slot in the plate $a'$, wherein it is retracted by a spiral spring, R′, and advanced by the action of a hammer or shoulder, $r$, on wheel C striking either against the end of a bar, $r'$, connected to the cutter or, preferably, against the side of a crank-arm, $R^2$, pivoted to the standard $a^4$ at $a^{12}$ and articulated to the rear end of the bar $r'$, as shown. Inasmuch as the needle might at times fail to sweep the cord forward far enough to insure its being caught by the binding-head, provision must be made for supplementing the operation of the needle by a further movement of mechanism which shall in all cases insure the advancing of the cord properly to the head. To accomplish this purpose I arrange on the upper side of the plate A a long sliding bar, S, guided by a slot or slots $s$ $s$ in said plate and corresponding studs, $s'$, projecting from the sliding plate into or through said guide slot or slots. This sliding bar is connected by a pitman, S′, to the crank $u$ of the rock-shaft U. The rock-shaft is further provided with a short inclined arm, $u'$, directly over the rim of the wheel C, and said rim is constructed with a projecting flange, $u^2$, extending a little more than one-quarter of the distance around the periphery of the wheel, and so arranged as by the revolution of the wheel to strike the arm $u'$, force it up, and hold it in that position until the flange $u^2$ has passed, when the arm is retracted by a spring, $S^2$, connected to the rock-shaft. The action of the flange in forcing the arm up, and thereby rocking the shaft, slides the bar S forward or outward in its guides, and causes a projecting head or jaw, V, upon its outer end to catch the cord and force it outward against the oblique portion of the arm $l$ and into the path of the hook $e'$, which is about to revolve, as above described.

The front shoulder or end of the flange $u^2$ is arranged so as to strike the arm $u'$ a moment before the spur $c^5$ strikes the spur $c^6$, in order that the bar S may have time to move forward to the binding-head before the gears $f$ $C^2$ come into operation and the head begins to revolve. An oblique spring, $v$, may be arranged in the slot $t$ to press against the side of the needle and cord as they are advancing, and thereby assist in carrying the cord over toward the binding-head. A spur or arm, $v'$, is also attached to the slide-bar S, and is so proportioned and adjusted as to strike against the cord in the angle between the wheel M and concave N when the bar moves outward, and thereby force the cord in between the clamping and holding faces of the said wheel and concave.

An ejector, W, extends from the outer or delivery edge of the binding-table back to the lower end of a swinging arm, $w$, pivoted to the plate A, and arranged in such position as to be struck by an arm, $w'$, on the shaft B, whereby the ejector-bar will be thrust forward and the effectual delivery of the bound bundle from the binding-table insured. A spring, $w^2$, will serve to retract the bar after the arm $w'$ has passed. The arm $w'$ should be arranged to operate the bar immediately after the cutter is advanced, and therefore it will come into action directly after the hammer $r$.

I do not limit myself to the precise form and construction of the several elements and combinations herein set forth, but desire to be at liberty to vary and modify the same, so long as the general principles and substantial mode of operation are retained.

Having thus described my invention, I claim as new—

1. In a harvester-binder, the combination of the needle J, its supporting-bars J′ $J^2$, and their guides with the operating crank-shaft B′, whereby the needle is caused to descend at the inner edge of the binding-table, sweep forward toward the outer edge, and rise and pass over the collecting grain in its return movement, substantially as described.

2. The sliding ejector W, its retracting-spring $w^2$, and swinging arm $w$, in combination with the arm $w'$ upon the shaft B, substantially as described.

3. In a grain-binding machine, the combination of a shaft, F, with an oscillating sleeve containing a rotatory looping shaft or head driven by the shaft F, substantially as described.

4. In a grain-binding machine, the oscillating sleeve or casting G and its contained shaft E, having the hooked jaw $e'$, in combination with the pivoted block or jaw I and mechanism for closing and opening said last-mentioned jaw by the rotation of the shaft E, substantially as described.

5. The combination of the oscillating casting or sleeve G, its contained shaft E, the hooked jaw $e'$, the pivoted jaw I, the stud $i^2$, the spring $i^3$, and the eccentric or cam surface I, substantially as described.

6. In a grain-binder, a rotating looper mounted in a box or casting which is pivoted to its own driving-shaft as its center of oscillation, and combined with mechanism for opening and closing its band-gripping jaws while revolving to form the loop, substantially as described.

7. The needle J, constructed to pass down at the inner edge and sweep forward to the outer edge of the binding-table, in combination with a looping-head constructed to advance and seize the cord after the needle has swept it forward, rotate to form a loop therein, and recede to tighten the knot and slip it from the head, substantially as described.

8. In a grain-binder, the combination of a rotating clamping-wheel, M, and fixed concave N with the plate L, having the oblique arm $l$, and with the curved plate P, substantially as described.

9. In a grain-binding machine, the combination of the oscillating and rotating binding-head with the tubular case G, having the arm $g^2$, and with the oscillating lever D', substantially as described.

10. In a grain-binding machine, the combination of the large wheel C, the shaft F, the casting G, the rotating tying-head, and the lever D', substantially as described.

11. In a grain-binding machine, the combination of the rotating and oscillating tying-head, the concave N, the clamping-wheel M, the lever D', and the oscillating plate O, having a spring-dog, $o$, for the purpose of moving the clamping-wheel simultaneously with the oscillation of the binding-head, substantially as described.

12. In a grain-binding machine, a needle which passes down at or near the inner edge of the binding-table and sweeps outward to gather the grain and advance the band to the binding-head with an intermittent wheel-clamp which receives and holds the band thus carried outward, a rotating looping-head which advances to seize the cord and form the loop therein, and recedes to form and tighten the knot, and with a cutter to sever the band immediately after the loop is formed therein, substantially as described.

13. The combination of the arm $v'$, the slide-bar S, the wheel M, and the concave N, substantially as described.

14. The combination of the clamping-wheel M, concave N, horn N', and oscillating rotating binding-head with the oblique angular arm $l$ for guiding and presenting the cord properly to the jaws of the binding-head, substantially as described.

LEWIS MILLER.

Witnesses:
N. N. LEOHUER,
L. H. HANSCOMB.